(12) United States Patent
Bijwe (10) Patent No.: US 9,036,517 B2
(45) Date of Patent: May 19, 2015

(54) METHODS AND APPARATUS FOR ESTABLISHING A TUNNELED DIRECT LINK SETUP (TDLS) SESSION BETWEEN DEVICES IN A WIRELESS NETWORK

(71) Applicant: Marvell World Trade Ltd., St. Michael (BB)

(72) Inventor: Sagar D. Bijwe, Maharashtra (IN)

(73) Assignee: Marvell World Trade Ltd., St. Michael (BB)

(*) Notice: Subject to any disclaimer, the term of this patent is extended or adjusted under 35 U.S.C. 154(b) by 140 days.

(21) Appl. No.: 13/735,458

(22) Filed: Jan. 7, 2013

(65) Prior Publication Data

US 2013/0176903 A1    Jul. 11, 2013

Related U.S. Application Data

(60) Provisional application No. 61/584,774, filed on Jan. 9, 2012.

(51) Int. Cl.
*H04B 7/00* (2006.01)
*H04W 76/02* (2009.01)

(52) U.S. Cl.
CPC .......... *H04W 76/022* (2013.01); *H04W 76/023* (2013.01); *H04W 76/027* (2013.01)

(58) Field of Classification Search
CPC ............ H04W 76/022; H04W 76/027; H04W 76/028
USPC .......... 370/310, 351, 431, 449, 463; 709/227, 709/228, 237, 238
See application file for complete search history.

(56) References Cited

U.S. PATENT DOCUMENTS

| 4,337,463 A | 6/1982 | Vangen |
| 5,673,291 A | 9/1997 | Dent |
| 6,035,210 A | 3/2000 | Endo et al. |
| 6,320,919 B1 | 11/2001 | Khayrallah et al. |
| 6,760,671 B1 | 7/2004 | Batcher et al. |
| 6,816,452 B1 | 11/2004 | Maehata |

(Continued)

FOREIGN PATENT DOCUMENTS

| EP | 1860827 | 11/2007 |
| JP | 2006174162 | 6/2006 |

(Continued)

OTHER PUBLICATIONS

"IEEE Standard for Information TechnologyTelecommunications and information exchange between systems Local and metropolitan area networksSpecific requirements Part 11: Wireless LAN Medium Access Control (MAC) and Physical Layer (PHY) specifications Amendment", IEEE Computer Society, Oct. 14, 2010, pp. 12-18, 23, 65-68.

(Continued)

*Primary Examiner* — Dmitry H Levitan (57) ABSTRACT

The present disclosure describes techniques for establishing and reestablishing tunneled direct link setup (TDLS) sessions. In some aspects a TDLS persistent capable bit is stored at a computing device to indicate whether the computing device is capable of storing persistent group[ information associated with TDLS sessions. Persistent group information is also stored at the computing device to assist the computing device in reestablishing TDLS sessions and directing reestablishment of TDLS sessions.

19 Claims, 7 Drawing Sheets

(56) References Cited

U.S. PATENT DOCUMENTS

| | | | |
|---|---|---|---|
| 7,239,882 B1 | 7/2007 | Cook | |
| 7,342,895 B2 | 3/2008 | Serpa et al. | |
| 7,551,948 B2 | 6/2009 | Meier et al. | |
| 7,564,826 B2 | 7/2009 | Sherman et al. | |
| 7,580,397 B2 | 8/2009 | Arai et al. | |
| 7,595,768 B2 | 9/2009 | Li et al. | |
| 7,599,671 B2 | 10/2009 | Kopikare et al. | |
| 7,626,966 B1 | 12/2009 | Ruiter et al. | |
| 7,711,004 B2 | 5/2010 | Xu | |
| 7,881,755 B1 | 2/2011 | Mishra et al. | |
| 7,957,340 B2 | 6/2011 | Choi et al. | |
| 7,966,036 B2 | 6/2011 | Kojima | |
| 8,014,329 B2 | 9/2011 | Gong | |
| 8,072,913 B2 | 12/2011 | Desai | |
| 8,078,111 B2 | 12/2011 | Jovicic et al. | |
| 8,140,075 B2 | 3/2012 | Watanabe | |
| 8,149,715 B1 | 4/2012 | Goel | |
| 8,170,002 B2 | 5/2012 | Wentink | |
| 8,170,546 B2 | 5/2012 | Bennett | |
| 8,189,506 B2 | 5/2012 | Kneckt et al. | |
| 8,203,985 B2 * | 6/2012 | Gong et al. | 370/311 |
| 8,229,087 B2 | 7/2012 | Sumioka et al. | |
| 8,254,296 B1 | 8/2012 | Lambert | |
| 8,274,894 B2 | 9/2012 | Kneckt et al. | |
| 8,310,967 B1 | 11/2012 | Goel | |
| 8,340,034 B1 | 12/2012 | Lee | |
| 8,472,427 B1 | 6/2013 | Wheeler et al. | |
| 8,553,561 B1 | 10/2013 | Chokshi et al. | |
| 8,737,370 B2 * | 5/2014 | Wentink | 370/338 |
| 8,750,278 B1 | 6/2014 | Wagholikar et al. | |
| 8,767,771 B1 | 7/2014 | Shukla et al. | |
| 8,817,662 B2 | 8/2014 | Mahaffy et al. | |
| 8,817,682 B1 | 8/2014 | Goel et al. | |
| 8,861,469 B1 | 10/2014 | Lee et al. | |
| 8,891,497 B1 | 11/2014 | Vleugels et al. | |
| 2002/0025810 A1 | 2/2002 | Takayama et al. | |
| 2002/0049854 A1 | 4/2002 | Cox et al. | |
| 2002/0102941 A1 | 8/2002 | Kuiri et al. | |
| 2003/0040316 A1 | 2/2003 | Stanforth et al. | |
| 2003/0214430 A1 | 11/2003 | Husted et al. | |
| 2004/0013128 A1 | 1/2004 | Moreton | |
| 2004/0105401 A1 | 6/2004 | Lee | |
| 2004/0192222 A1 | 9/2004 | Vaisanen et al. | |
| 2004/0233881 A1 | 11/2004 | Kang et al. | |
| 2004/0264396 A1 | 12/2004 | Ginzburg et al. | |
| 2004/0264397 A1 | 12/2004 | Benveniste | |
| 2005/0018641 A1 | 1/2005 | Zhao et al. | |
| 2005/0025104 A1 | 2/2005 | Fischer et al. | |
| 2005/0025174 A1 | 2/2005 | Fischer et al. | |
| 2005/0135360 A1 | 6/2005 | Shin et al. | |
| 2005/0174962 A1 | 8/2005 | Gurevich | |
| 2005/0186962 A1 | 8/2005 | Yoneyama et al. | |
| 2005/0195786 A1 | 9/2005 | Shpak | |
| 2005/0206554 A1 | 9/2005 | Yamaura | |
| 2005/0250528 A1 | 11/2005 | Song et al. | |
| 2005/0254423 A1 | 11/2005 | Berghoff | |
| 2005/0281278 A1 | 12/2005 | Black et al. | |
| 2006/0007863 A1 | 1/2006 | Naghian | |
| 2006/0079232 A1 | 4/2006 | Omori et al. | |
| 2006/0120338 A1 | 6/2006 | Hwang et al. | |
| 2006/0199565 A1 | 9/2006 | Ammirata | |
| 2006/0200862 A1 | 9/2006 | Olson et al. | |
| 2006/0215601 A1 | 9/2006 | Vleugels et al. | |
| 2006/0251198 A1 | 11/2006 | Ma et al. | |
| 2006/0252418 A1 | 11/2006 | Quinn et al. | |
| 2006/0264179 A1 | 11/2006 | Bonneville et al. | |
| 2006/0268756 A1 | 11/2006 | Wang et al. | |
| 2006/0268804 A1 | 11/2006 | Kim et al. | |
| 2006/0282541 A1 | 12/2006 | Hiroki | |
| 2006/0282667 A1 | 12/2006 | Kim et al. | |
| 2006/0286935 A1 | 12/2006 | Utsunomiya et al. | |
| 2007/0010237 A1 | 1/2007 | Jones et al. | |
| 2007/0010247 A1 | 1/2007 | Mouna-Kingue et al. | |
| 2007/0014314 A1 | 1/2007 | O'Neil | |
| 2007/0026810 A1 | 2/2007 | Love et al. | |
| 2007/0032211 A1 | 2/2007 | Kopikare et al. | |
| 2007/0060057 A1 | 3/2007 | Matsuo et al. | |
| 2007/0109973 A1 | 5/2007 | Trachewsky | |
| 2007/0178888 A1 | 8/2007 | Alfano et al. | |
| 2007/0183443 A1 | 8/2007 | Won | |
| 2007/0206519 A1 | 9/2007 | Hansen et al. | |
| 2007/0206762 A1 | 9/2007 | Chandra et al. | |
| 2007/0223430 A1 | 9/2007 | Desai et al. | |
| 2007/0238482 A1 | 10/2007 | Rayzman et al. | |
| 2007/0242645 A1 | 10/2007 | Stephenson et al. | |
| 2007/0268862 A1 | 11/2007 | Singh et al. | |
| 2007/0286298 A1 | 12/2007 | Choi et al. | |
| 2007/0297388 A1 | 12/2007 | Appaji et al. | |
| 2008/0056201 A1 | 3/2008 | Bennett | |
| 2008/0069034 A1 | 3/2008 | Buddhikot et al. | |
| 2008/0080446 A1 | 4/2008 | Chung | |
| 2008/0095058 A1 | 4/2008 | Dalmases et al. | |
| 2008/0095059 A1 | 4/2008 | Chu | |
| 2008/0100494 A1 | 5/2008 | Yamaura | |
| 2008/0130595 A1 | 6/2008 | Abdel-Kader | |
| 2008/0137580 A1 | 6/2008 | Axelsson et al. | |
| 2008/0139212 A1 | 6/2008 | Chen et al. | |
| 2008/0161031 A1 | 7/2008 | Tu | |
| 2008/0170550 A1 | 7/2008 | Liu et al. | |
| 2008/0181154 A1 | 7/2008 | Sherman | |
| 2008/0187003 A1 | 8/2008 | Becker | |
| 2008/0232287 A1 | 9/2008 | Shao et al. | |
| 2008/0259846 A1 | 10/2008 | Gonikberg et al. | |
| 2008/0261640 A1 | 10/2008 | Yoshida | |
| 2008/0262991 A1 | 10/2008 | Kapoor et al. | |
| 2008/0279163 A1 | 11/2008 | Desai | |
| 2008/0320108 A1 | 12/2008 | Murty et al. | |
| 2009/0010210 A1 | 1/2009 | Hiertz et al. | |
| 2009/0137206 A1 | 5/2009 | Sherman et al. | |
| 2009/0175250 A1 | 7/2009 | Mathur et al. | |
| 2009/0196210 A1 | 8/2009 | Desai | |
| 2009/0239471 A1 | 9/2009 | Tran et al. | |
| 2009/0245133 A1 | 10/2009 | Gupta et al. | |
| 2009/0245279 A1 | 10/2009 | Wan et al. | |
| 2009/0247217 A1 | 10/2009 | Hsu et al. | |
| 2009/0258603 A1 | 10/2009 | Ghaboosi et al. | |
| 2009/0268652 A1 | 10/2009 | Kneckt et al. | |
| 2009/0285264 A1 | 11/2009 | Aldana et al. | |
| 2010/0011231 A1 | 1/2010 | Banerjea et al. | |
| 2010/0029325 A1 | 2/2010 | Wang et al. | |
| 2010/0061244 A1 | 3/2010 | Meier et al. | |
| 2010/0069112 A1 | 3/2010 | Sun et al. | |
| 2010/0124213 A1 | 5/2010 | Ise et al. | |
| 2010/0130129 A1 | 5/2010 | Chang et al. | |
| 2010/0138549 A1 | 6/2010 | Goel et al. | |
| 2010/0165896 A1 | 7/2010 | Gong et al. | |
| 2010/0238793 A1 | 9/2010 | Alfano et al. | |
| 2010/0293293 A1 | 11/2010 | Beser | |
| 2010/0311342 A1 | 12/2010 | Arbel | |
| 2010/0316027 A1 | 12/2010 | Rick et al. | |
| 2010/0322213 A1 | 12/2010 | Liu et al. | |
| 2011/0002226 A1 | 1/2011 | Bhatti | |
| 2011/0007675 A1 | 1/2011 | Chiou et al. | |
| 2011/0009074 A1 | 1/2011 | Hsu et al. | |
| 2011/0069689 A1 * | 3/2011 | Grandhi et al. | 370/338 |
| 2011/0097998 A1 | 4/2011 | Ko et al. | |
| 2011/0103363 A1 | 5/2011 | Bennett | |
| 2011/0142014 A1 | 6/2011 | Banerjee et al. | |
| 2011/0161697 A1 | 6/2011 | Qi et al. | |
| 2011/0194519 A1 | 8/2011 | Habetha | |
| 2012/0039176 A1 | 2/2012 | Eshan et al. | |
| 2012/0099476 A1 | 4/2012 | Mahaffy | |
| 2012/0250576 A1 * | 10/2012 | Rajamani et al. | 370/254 |
| 2012/0276938 A1 | 11/2012 | Wagholikar et al. | |
| 2012/0327779 A1 | 12/2012 | Gell et al. | |
| 2013/0114548 A1 | 5/2013 | Banerjea | |
| 2013/0227152 A1 * | 8/2013 | Lee et al. | 709/227 |
| 2014/0362735 A1 | 12/2014 | Mahaffy | |

FOREIGN PATENT DOCUMENTS

| | | |
|---|---|---|
| WO | WO-2006043956 | 4/2006 |
| WO | WO-2006090254 | 8/2006 |
| WO | WO-2007008981 | 1/2007 |

(56) References Cited

FOREIGN PATENT DOCUMENTS

| WO | WO-2007064822 | 6/2007 |
|---|---|---|
| WO | WO-20080707777 | 6/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"PCT Search Report and Written Opinion", Application No. PCT/IB2013/000390, Aug. 21, 2013, 19 Pages.
"IEEE Standard for Information Technology—Telecommunications and Information Exchange between Systems—Local and Metropolitan Area Networks—Specific Requirements", IEEE Std. 802.11-2007, Jun. 12, 2007, 1232 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; Amendment 1: Radio Resource Measurement of Wireless LANs; IEEE Std 802.11k—2008, Jun. 12, 2008, 244 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.
"Introduction to 802.11n Outdoor Wireless Networks", InscapeData White Paper, Mar. 29, 2011, 9 pages.
"Non-Final Office Action", U.S. Appl. No. 13/673,363, Nov. 29, 2013, 12 pages.
"Non-Final Office Action", U.S. Appl. No. 12/646,721, May 8, 2014, 17 pages.
"Non-Final Office Action", U.S. Appl. No. 12/646,802, May 21, 2014, 19 pages.
"Notice of Allowance", U.S. Appl. No. 13/722,354, May 15, 2014, 4 pages.
"Supplemental Notice of Allowance", U.S. Appl. No. 13/479,124, Apr. 18, 2014, 5 pages.
"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, 2012, 302 pages.
"Advisory Action", U.S. Appl. No. 12/646,721, Aug. 13, 2013, 3 pages.
"Draft Standard for Information Technology—Telecommunications and information exchange between systems—Local and metropolitan area networks—Specific requirements", IEEE P802.11s/D1.03, Apr. 2007, 251 pages.
"Final Office Action", U.S. Appl. No. 12/646,802, Nov. 15, 2012, 15 pages.
"Final Office Action", U.S. Appl. No. 12/646,721, Jun. 6, 2013, 16 pages.
"Final Office Action", U.S. Appl. No. 12/484,563, Apr. 24, 2012, 18 pages.
"Final Office Action", U.S. Appl. No. 12/616,454, Apr. 11, 2012, 19 pages.
"Final Office Action", U.S. Appl. No. 12/186,429, Oct. 13, 2011, 23 pages.
"Final Office Action", U.S. Appl. No. 12/542,845, Sep. 25, 2012, 23 pages.
"Further Higher Data Rate Extension in the 2.4 GHz Band", IEEE P802.11g/D8.2, Draft Supplement to Standard [for] Information Technology, Apr. 2003, 69 pages.
Haas, et al., "Gossip-Based Ad Hoc Routing", IEEE/ACM Transactions on Networking, vol. 14, No. 3, Jun. 2006, pp. 479-491.
"International Search Report and Written Opinion", PCT Application PCT/US2012/035597, Aug. 6, 2012, 13 pages.
"Non-Final Office Action", U.S. Appl. No. 12/167,841, Jul. 15, 2011, 10 pages.
"Non-Final Office Action", U.S. Appl. No. 13/099,169, Mar. 28, 2013, 12 pages.
"Non-Final Office Action", U.S. Appl. No. 13/429,090, Oct. 24, 2013, 13 pages.
"Non-Final Office Action", U.S. Appl. No. 12/484,563, Oct. 4, 2011, 13 pages.
"Non-Final Office Action", U.S. Appl. No. 12/732,036, Aug. 9, 2012, 13 pages.
"Non-Final Office Action", U.S. Appl. No. 13/479,124, Sep. 27, 2013, 14 pages.
"Non-Final Office Action", U.S. Appl. No. 12/646,721, Nov. 7, 2012, 15 pages.
"Non-Final Office Action", U.S. Appl. No. 12/646,721, May 10, 2012, 15 pages.
"Non-Final Office Action", U.S. Appl. No. 12/646,802, Mar. 29, 2012, 16 pages.
"Non-Final Office Action", U.S. Appl. No. 12/186,429, Apr. 25, 2011, 19 pages.
"Non-Final Office Action", U.S. Appl. No. 12/542,845, Apr. 4, 2012, 19 pages.
"Non-Final Office Action", U.S. Appl. No. 12/542,845, Oct. 23, 2013, 29 pages.
"Non-Final Office Action", U.S. Appl. No. 12/616,454, Dec. 22, 2011, 8 pages.
"Non-Final Office Action", U.S. Appl. No. 13/249,740, Mar. 26, 2013, 9 pages.
"Non-Final Office Action", U.S. Appl. No. 13/249,740, Oct. 16, 2013, 9 pages.
"Non-Final Office Action", U.S. Appl. No. 13/099,169, Oct. 4, 2013, 9 pages.
"Notice of Allowance", U.S. Appl. No. 12/167,841, Nov. 25, 2011, 11 pages.
"Notice of Allowance", U.S. Appl. No. 12/616,454, Aug. 22, 2012, 4 pages.
"Notice of Allowance", U.S. Appl. No. 12/484,563, Jul. 9, 2012, 6 pages.
"Notice of Allowance", U.S. Appl. No. 12/716,569, Apr. 19, 2012, 7 pages.
"Notice of Allowance", U.S. Appl. No. 12/732,036, Feb. 21, 2013, 8 pages.
"Notice of Allowance", U.S. Appl. No. 12/186,429, Jun. 6, 2013, 9 pages.
"Part 11: Wireless LAN Medium Access Control (MAC) and Physical Layer (PHY) specifications", IEEE Std 802.11b-1999/Cor 1-2001, Amendment 2: Higher-speed Physical Layer (PHY) extension in the 2.4 GHz band, Nov. 7, 2001, 23 pages.
"Part 11: Wireless LAN Medium Access Control (MAC) and Physical Layer (PHY) specifications", IEEE Std 802.11a-1999, High-speed Physical Layer in the 5 GHz Band, 1999, 91 pages.
"Part 11: Wireless LAN Medium Access Control (MAC) and Physical Layer (PHY) specifications", Information technology—Telecommunications and information exchange between systems—Local and metropolitan area networks—Specific requirements—, IEEE, Apr 2003, pp. 1-69.
"PCT Search Report and Written Opinion", Application No. PCT/US2013/025144, Jun. 5, 2013, 10 pages.
"PCT Search Report and Written Opinion", Application No. PCT/US2011/054358, Dec. 16, 2011, 13 pages.
"Restriction Requirement", U.S. Appl. No. 12/167,841, May 12, 2011, 6 pages.
"Supplemental Notice of Allowance", U.S. Appl. No. 12/186,429, Jul. 10, 2013, 2 pages.
"Supplemental Notice of Allowance", U.S. Appl. No. 12/716,569, Jul. 23, 2012, 2 pages.
Mujtaba "TGn Sync Proposal Technical Specification", IEEE 802.11-04/0889r6, This document presents the technical specification for the MAC and the PHY layer of the TGn Sync proposal to IEEE 802.11 TGn, May 18, 2005, pp. 1-131.
Mujtaba "TGn Sync Proposal Technical Specification", IEEE 802.11-04 / Wireless LANs, May 2005, pp. 1-131.

(56) References Cited

OTHER PUBLICATIONS

"Non-Final Office Action", U.S. Appl. No. 13/722,354, Jan. 17, 2014, 17 pages.

"Notice of Allowance", U.S. Appl. No. 13/099,169, Feb. 12, 2014, 11 pages.

"Notice of Allowance", U.S. Appl. No. 13/249,740, Mar. 11, 2014, 6 pages.

"Notice of Allowance", U.S. Appl. No. 13/479,124, Jan. 30, 2014, 7 pages.

"Notice of Allowance", U.S. Appl. No. 13/673,363, Mar. 24, 2014, 4 pages.

"Wi-Fi Peer-to-Peer (P2P) Technical Specification", Wi-Fi Alliance Technical Committee P2P Task Group; Draft Version 1.14, Jun. 25, 2010, 154 pages.

"Final Office Action", U.S. Appl. No. 12/646,721, Nov. 28, 2014, 19 pages.

"Final Office Action", U.S. Appl. No. 12/646,802, Dec. 17, 2014, 17 pages.

"Non-Final Office Action", U.S. Appl. No. 13/622,916, Sep. 10, 2014, 10 pages.

"Non-Final Office Action", U.S. Appl. No. 14/275,615, Oct. 6, 2014, 28 pages.

"Non-Final Office Action", U.S. Appl. No. 14/466,687, Oct. 3, 2014, 5 pages.

"Non-Final Office Action", U.S. Appl. No. 12/646,802, Apr. 8, 2015, 19 pages.

"Notice of Allowance", U.S. Appl. No. 13/622,916, Mar. 30, 2015, 4 pages.

"Notice of Allowance", U.S. Appl. No. 14/275,615, Feb. 27, 2015, 7 pages.

Deering, "Version 6 (IPv6) Specification", RFC2460, Dec. 1998, 35 pages.

* cited by examiner

METHODS AND APPARATUS FOR ESTABLISHING A TUNNELED DIRECT LINK SETUP (TDLS) SESSION BETWEEN DEVICES IN A WIRELESS NETWORK

CROSS-REFERENCE TO RELATED APPLICATIONS

This present disclosure claims priority to U.S. Provisional Patent Application No. 61/584,774, filed on Jan. 9, 2012, the disclosure of which is incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A tunneled direct link setup (TDLS), as defined by IEEE Standard 802.11z and related IEEE Standard 802.11mb, may be used to support wireless communication. A TDLS session, for instance, allows computing devices to exchange data or obtain services directly from other computing devices. A WLAN is initially used to setup the TDLS session, and the computing devices in a TDLS session are connected to the same wireless access point.

However, each time a TDLS session is setup, a TDLS discovery operation and TDLS setup operation are involved. Further, information about the computing devices, such as connection information and capabilities, is lost each time a TDLS session is lost or terminated using conventional techniques. Thus, TDLS sessions setup using conventional techniques are typically slow and computationally expensive to setup.

SUMMARY

This summary is provided to introduce subject matter that is further described below in the Detailed Description and Drawings. Accordingly, this Summary should not be considered to describe essential features nor used to limit the scope of the claimed subject matter.

In one aspect, the present disclosure describes a method implemented to send a TDLS discovery request from a TDLS device and to receive a TDLS discovery response at the TDLS device. The method is further implemented to send a TDLS setup request from the TDLS device, receive a TDLS setup response at the TDLS device, and send a TDLS setup confirmation from the TDLS device. Finally, the method is implemented to establish a TDLS session and store persistent information from the TDLS setup response on the TDLS device.

The method is further implemented to send, from a first TDLS device to a second TDLS device, a TDLS setup request based at least in part on persistent information about the second TDLS device, receive a TDLS setup response at the first TDLS device from the second TDLS device, and send a TDLS setup confirmation from the first TDLS device to the second TDLS device. The method is further implement to reestablish a TDLS session between the first TDLS device and the second TDLS device without a TDLS discovery request and TDLS discovery response.

A system-on-chip (SoC) includes a transmitter configured to transmit via a wireless medium. The SoC also includes a receiver configured to receive via the wireless medium. Finally, the SoC includes a TDLS connection module configured to transmit, via the transmitter, a TDLS setup request based at least in part on persistent information about a member device of a TDLS group. The TDLS connection module is further configured to receive, via the receiver, a TDLS setup response from the member device. The TDLS connection module is also configured to transmit, via the transmitter, a TDLS setup confirmation to the member device. Lastly, the TDLS connection module is configured to establish, via the wireless medium, a TDLS session with the member device.

The details of one or more implementations are set forth in the accompanying drawings and the description below. Other features and advantages will be apparent from the description and drawings.

BRIEF DESCRIPTION OF THE DRAWINGS

The details of one or more implementations are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

Conventional techniques for establishing a TDLS session fail to store information about the computing devices that are connected. This leads to inefficiencies in establishing TDLS sessions, namely an inability to select computing devices with which to establish a TDLS session, redundant setup operations, and so on. This disclosure describes techniques of reinvoking or reestablishing TDLS sessions based on information that is persistently stored (e.g. persistent group information) about computing devices. In one implementation, the persistent group information is stored at a particular device subsequent to the establishment of a TDLS session. The persistent group information can be used to, among other operations, direct a computing device to establish a TDLS session with another computing device that has a desired capability, attempt to make a computing device connection with a wireless access point to enable a TDLS session setup, and otherwise manage storage of the persistent group information.

In an example use scenario, a user of a smart phone may come home from work and desire access to music stored at a server. With current TDLS architecture, the user experiences a delay in accessing their music each time a TDLS session is established with the server. With the TDLS architecture disclosed below with reference to FIGS. 1-7, a user of the mobile phone may connect with the server with significantly reduced delay when reestablishing the session.

Additionally, the mobile phone may direct setup of TDLS sessions based on a user's desired actions, rather than performing TDLS discovery on all the devices in range, performing TDLS setup with all the devices in range, and then searching through the devices to find a device with the desired capabilities. In this way, if the user desired to access a separate server with personal videos and pictures stored therein, the mobile phone could direct the TDLS setup to the server with the personal videos and pictures, rather than the music server. Therefore, a user would be able to switch between listening to music and posting information to social media sites with increased efficiency. Further, if a mobile phone had previously connected with a server, once the mobile phone came within range of the server, the server could initiate reestablishment of a TDLS session with the mobile phone. Thus, memory could be saved on the mobile phone by allowing the server to store the TDLS persistent group information.

Also, devices in a TDLS session may be required to connect to the same access point. In another example use scenario, a mobile phone user who is walking through a mall may have the option of connecting with multiple access points, such as access points associated with advertising servers owned by the various retail outlets. With current TDLS architecture, the mobile phone would be unable to browse available advertisements on the available servers, since each store would likely have its own access point. With the TDLS architecture disclosed below, a mobile phone user would be able to seek out access points to interact with different stores, such as to view promotions associated with different retail outlets.

Further, a user may desire to share persistent information with multiple devices. For example, a mobile phone may share persistent information with a tablet device if a user authenticates a user account on both the mobile phone and the tablet. Alternatively, a user may desire to share persistent information with another user. For example, a friend of the user with the music server may visit. Rather than going through TDLS discovery to find the servers in the original user's home, the original user may share persistent information with the friend to reduce setup time and allow directed TDLS session establishment. The sharing may utilize public action frames.

The following discussion describes an operating environment, techniques that may be employed in the operating environment, and a SoC in which components of the operating environment can be embodied. In the discussion below, reference is made to the operating environment by way of example only.

Operating Environment

Figure 1:
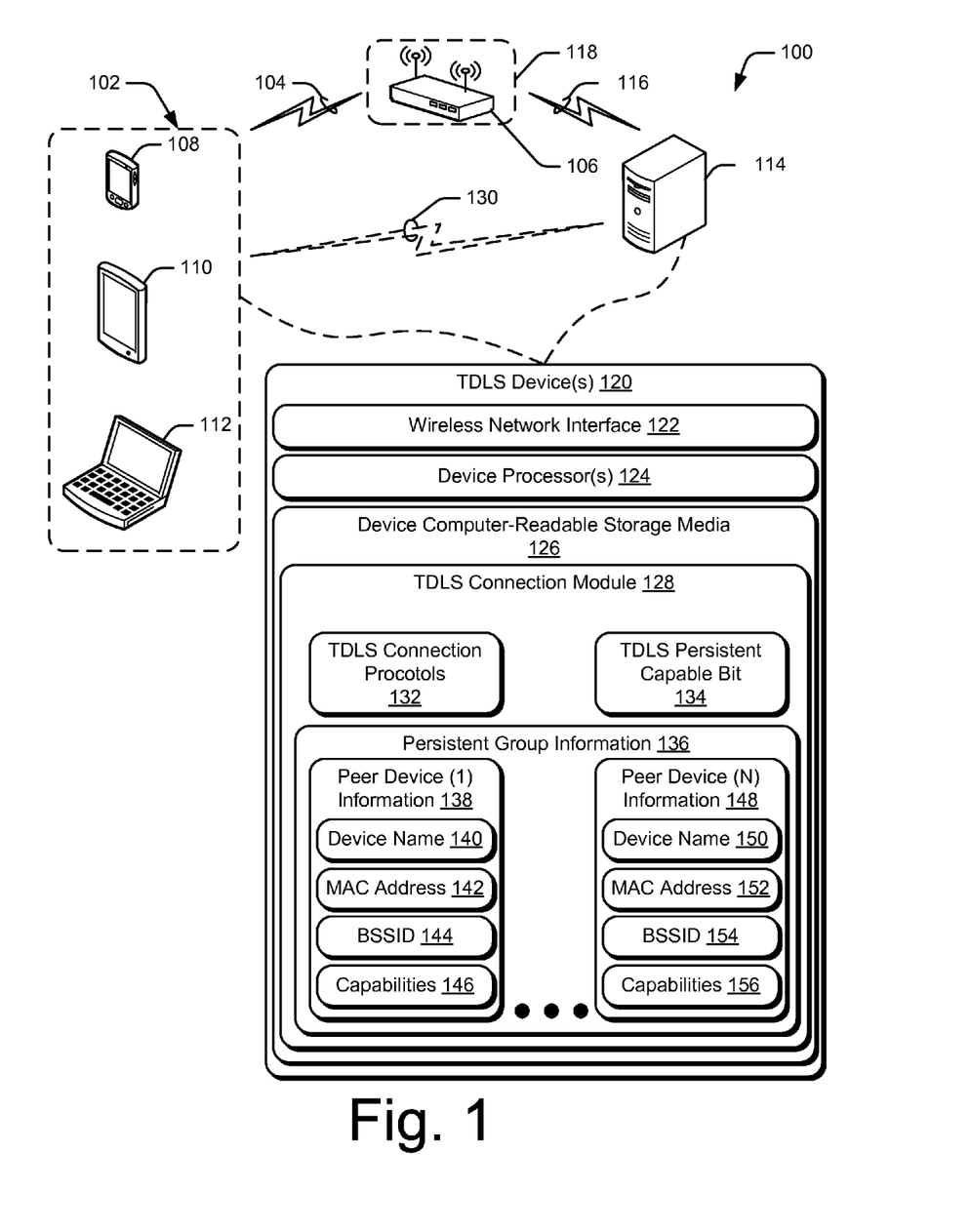
FIG. 1 illustrates an operating environment having wireless devices in accordance with one or more aspects.

FIG. 1 illustrates an example operating environment 100 having mobile wireless devices 102, each of which are capable of communicating data, packets, and/or frames over a wireless connection 104, such as a wireless-local-area network (WLAN) enabled by wireless access point 106. Mobile wireless devices 102 include smart-phone 108, tablet computer 110, and laptop computer 112. Although not shown, other configurations of mobile wireless devices 102 are also contemplated such as a mobile-internet device (MID), mobile gaming console, electronic readers or books (e-readers or e-books), and so on. Non-mobile wireless devices, such as a desktop computer, server, internet protocol enabled televisions (IP TVs), and so on, are also included in the example operating environment 100. The non-mobile wireless devices, such as server 114, are capable of communicating data, packets, and/or frames over a network connection 116, such as a WLAN. Gateway device 118 includes wireless access point 106.

The mobile wireless devices 102 and the non-mobile wireless devices, such as server 114, are TDLS devices 120. Each TDLS device 120 includes a wireless network interface 122 for providing a wireless interface to handle various communication protocols, such as for example IEEE 802.11-2007, IEEE 802.11n, IEEE 802.11z, 802.11 mb, and the like. For example, a mobile wireless device 102 can establish a TDLS session via a data-link layer when implementing the IEEE 802.11z protocol. The data-link layer includes the media access control (MAC) sub-layer. Wireless network interface may include a combined transmitter and receiver (shown) or a separate transmitter and receiver (not shown) and may be hardware combined with or separate from firmware or software.

TDLS devices 120 also include one or more processors 124, computer-readable storage media 126 (CRM 126), and TDLS connection module 128, which, in one implementation, is embodied on CRM 126. Processor 124 can be any suitable type of processor, either single-core or multi-core, for executing instructions or code associated with applications and/or an operating system of a mobile wireless device 102. Processor 124 may be constructed with or fabricated from any suitable material such as silicon or other semiconductors. CRM 126 may include any suitable memory or storage device such as random-access memory (RAM), static RAM (SRAM), non-volatile RAM (NVRAM), read-only memory (ROM), or Flash memory useful to store data of applications and/or an operating system of the wireless device 102. Further, the CRM 126 may be differentiated from and therefore does not include a signal medium and thus signals per se. Example implementation of the TDLS connection module 128 is described below.

TDLS devices 120 may be configured as client devices in a wireless network having an infrastructure-based topology, such as when connecting to gateway device 118. Alternately or additionally, TDLS devices 120 may be configured to enable communication with other TDLS devices. In some cases, a mobile wireless device 102 may concurrently associate with gateway device 118 and establish a TDLS session with a TDLS device 120, such as server 114 to the mobile wireless device 102.

Gateway device 118 is illustrated as including a wireless access point 106 (i.e., access point 106). Other gateway devices 118 contemplated include various networking devices, such as routers, mobile hotspots, wireless repeaters, wireless devices configured to share a wireless connection, and so on. Gateway device 118 may provide access to resources, services (e.g., capabilities or functions), the Internet, or other networks communicatively coupled with gateway device 118. For example, smart phone 108 is able to access the Internet when connected wirelessly to gateway device 118.

Gateway device 118 may also include a wireless transceiver, which provides a wireless interface to handle various communication protocols, such as those mentioned above and elsewhere herein. Wireless transceiver may be implemented as a single transceiver or a separate transmitter and receiver, and may be hardware combined with or separate from firmware or software. A network interface of gateway device 118 enables communication with other networks, which is described in greater detail below. Gateway device 118 also includes one or more micro-processors, and gateway computer-readable storage media. Gateway CRM may include any suitable memory or storage device such as static RAM (SRAM), ROM, or Flash memory useful to store data of applications and/or an operating system of the gateway device 118.

A mobile wireless device 102 may be connected to server 114 through a TDLS session 130, which is represented through use of a phantom arrow in the figure. As illustrated, any TDLS device 120 may be connected to any other TDLS device through a TDLS session 130 after TDLS setup, as discussed below in relation to FIGS. 1-5.

CRM 126 includes a TDLS connection module 128 that is configured to enable establishment or reestablishment of TDLS sessions between TDLS devices 120, such as between a mobile wireless device 102 and a server 114. TDLS connection protocols 132 are representative of the operations involved to establish or reestablish a TDLS session. TDLS persistent capable bit 134 may be used as an indication of whether the TDLS device is capable of storing persistent information associated with TDLS sessions.

Persistent group information 136 represents information that is persistently stored and is associated with TDLS device (1) through TDLS device (N). TDLS devices (1) through TDLS device (N) are other TDLS devices with which the TDLS device 120 has previously established a TDLS session. For example, server 114 may store persistent group information 136 associated with mobile wireless devices 108-112. In addition, smart phone 108 may store persistent group information 136 associated with server 114. Persistent group information 136 is stored in a persistent manner, such that if a TDLS session is terminated, the persistent group information 136 is maintained on one or both of the TDLS devices 120 that were connected through the TDLS session. Thus, persistent group information 136 may be stored upon establishment of a TDLS session, or at any time during the TDLS session.

The persistent group information 136 may include a variety of different types of information. For example, TDLS device (1) information 138 may include a device name 140 of TDLS device (1). The device name 140 may be customizable, and may be set by a user or administrator of TDLS device (1). TDLS device (1) information 138 may also include a MAC address 142 of TDLS device (1). TDLS device (1) information 138 may further include a basic service set identifier (BSSID) 144. The BSSID 144 may include or be set to the MAC address of the access point 106 that was used to establish the TDLS session between TDLS device 120 and TDLS device (1). TDLS device (1) information 138 may also include capabilities 144 associated with the applications present on TDLS device (1). Capabilities 144 may also be associated with hardware or other characteristics of TDLS device (1). Similar information to TDLS device (1) information 138 may be stored for each TDLS device with which TDLS device 120 has previously established a TDLS session, for example TDLS device (N) information 146.

Techniques of Establishing TDLS Sessions

Figure 2:
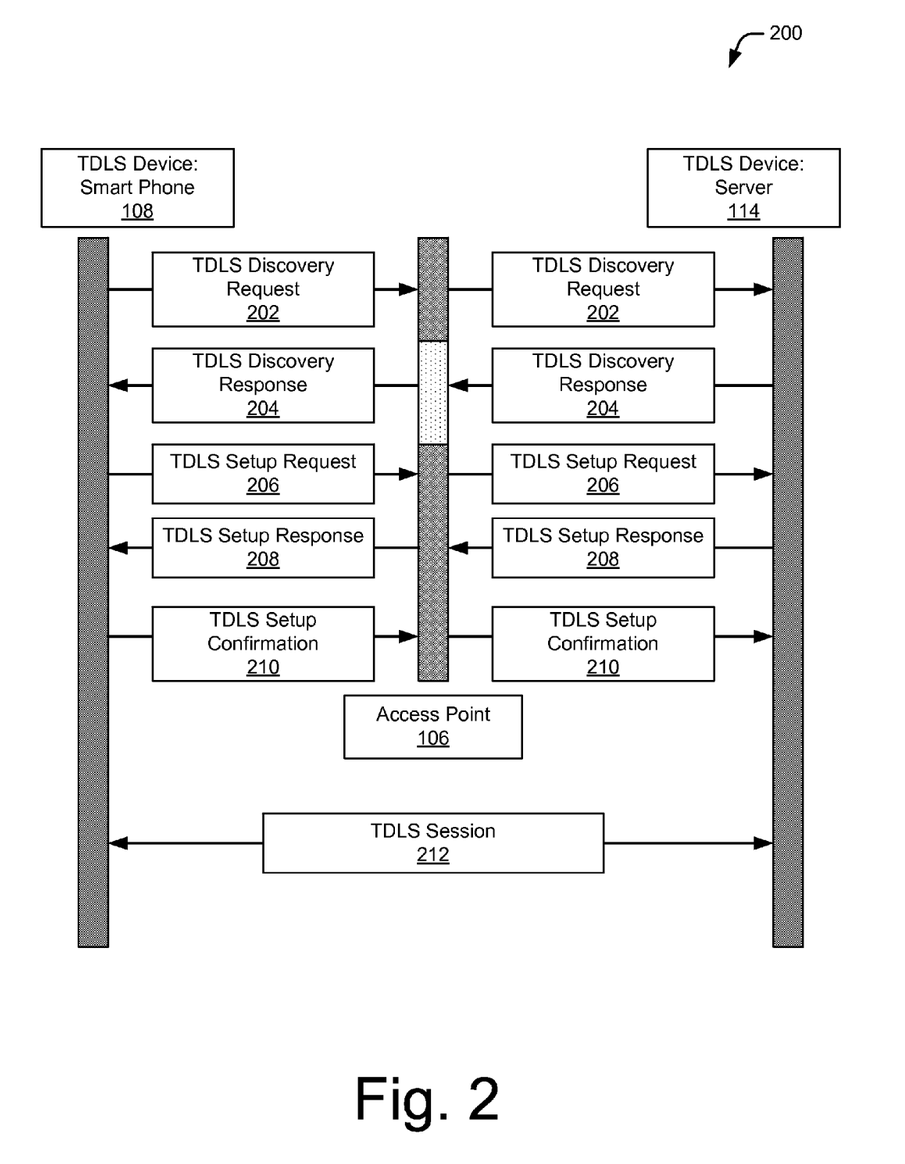
FIG. 2 illustrates an example of devices of FIG. 1 setting up a TDLS session in accordance with one or more aspects.

FIG. 2 illustrates an example of smart phone 108 setting up a TDLS session with server 116. Device environment 200 includes smart phone 108, server 114, and access point 106 of FIG. 1.

When smart phone 108 is connected to access point 106, smart phone 108 may be configured to transmit an open access TDLS discovery request 202. The TDLS discovery request includes a TDLS persistent capable bit 134, which is an indication of whether the TDLS device is capable of storing persistent information associated with TDLS sessions. Also, the TDLS persistent capable bit may be included within existing TDLS discovery request communication protocols. For example, the TDLS persistent capable bit may be included as the unassigned bit within the current TDLS discovery request message architecture. Access point 106 may receive TDLS discovery request 202, and transmit TDLS discovery request 202 to server 114. Server 114 may then receive the TDLS discovery request 202 and send TDLS discovery response 204 to smart phone 108 through access point 106. Alternatively, server 114 may send TDLS discovery response 204 directly to smart phone 108 through a unicast public action frame. Further, server 114 may send TDLS discovery response to smart phone 108 in an unsolicited manner, where the smart phone 108 does not send a TDLS discovery request 202. TDLS discovery response 204 may include a TDLS persistent capable bit 134 and other information necessary to establish a TDLS session. For example, TDLS discovery response 204 may include the device name of server 114, the MAC address of server 114, and the BSSID of server 114.

Upon receipt of the TDLS discovery response 204, smart phone 108 initiates a TDLS setup request 206. The TDLS setup request 206 may be based at least in part on the information about server 114, and uses this information to pass through access point 106 to server 114. Server 114 responds to TDLS setup request 206 with TDLS setup response 208, which passes through access point 106 and is received at smart phone 108. Smart phone 108 then sends TDLS setup confirmation 210 to server 114 through access point 106. A TDLS session 212 may be established at smart phone 104 any time after smart phone 108 sends TDLS setup confirmation 210. In addition, a TDLS session may be established at server 114 any time after server 114 receives TDLS setup confirmation 210.

Techniques of Establishing and Reestablishing a TDLS Session

The following discussion describes techniques for establishing and reestablishing or reinvoking a TDLS session based on persistent group information. These techniques can be implemented using the previously described environments or techniques, such as TDLS connection module 128 of FIG. 1 embodied on a TDLS device 120 and the method described in FIG. 2. These techniques include methods illustrated in FIGS. 3, 4, and 5, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and techniques of FIG. 2 by way of example. Such reference is not to be taken as limited to operating environment 100 but rather as illustrative of one of a variety of examples.

Figure 3:
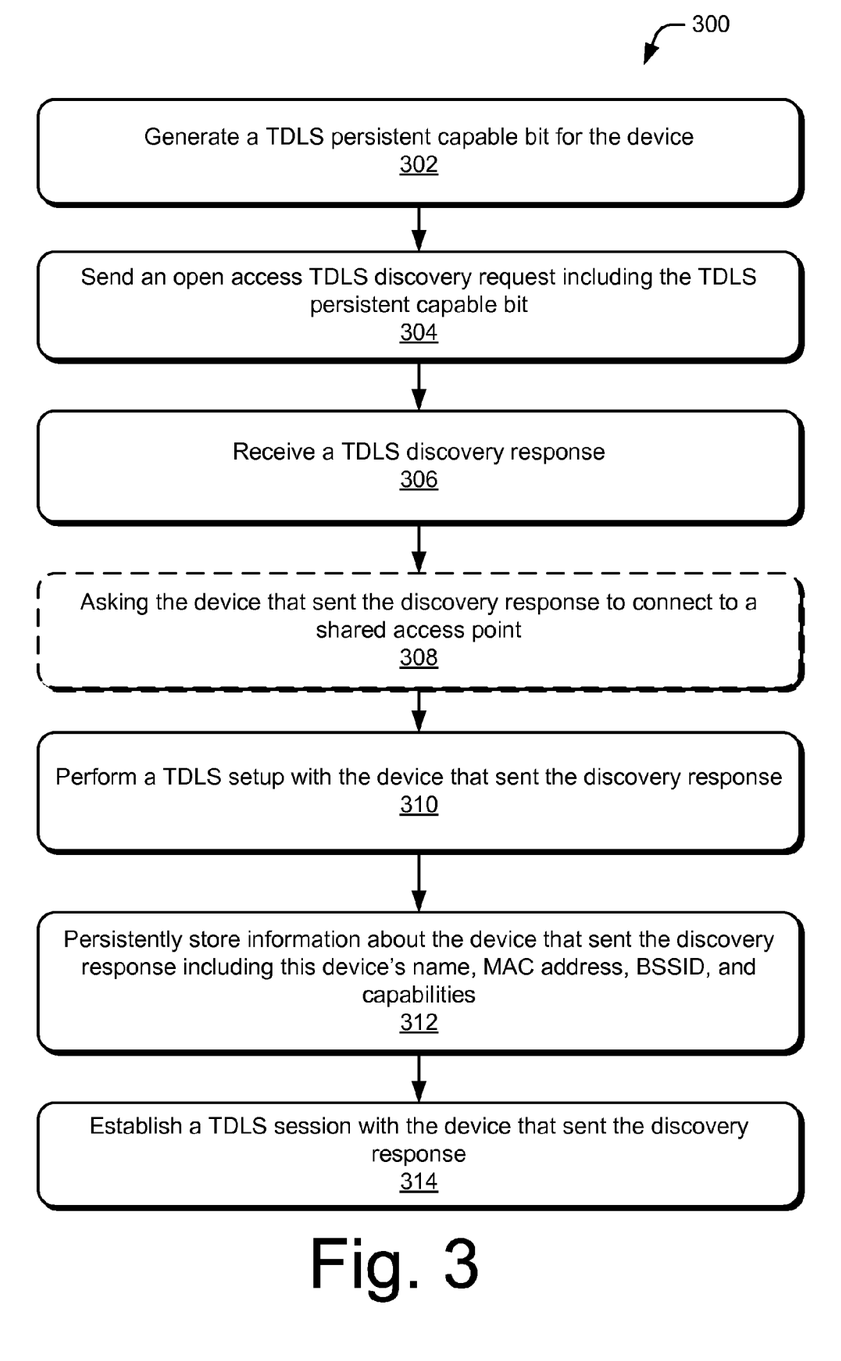
FIG. 3 illustrates a method of establishing a TDLS session and storing information about computing devices in the TDLS session.

FIG. 3 illustrates a method of establishing a TDLS session and storing information about TDLS devices 120 in the TDLS session. By using this method when first establishing a TDLS session, the persistent group information gathered during this method allows methods, such as those illustrated below in relation to FIGS. 4 and 5, to utilize the persistent group information. The persistent group information makes reestablishing a TDLS session more efficient, less computationally costly, and allows a TDLS session to be established when one or neither of the TDLS devices is connected to the same access point or either of the TDLS devices is connected to a different access point.

At 302, a TDLS device generates or sets a TDLS persistent capable bit 134 for the TDLS device 120. This TDLS persistent capable bit 134 is an indication whether the TDLS device 120 supports storing persistent information associated with TDLS sessions. The TDLS persistent capable bit 134 could be set, for example, to 0 to signify that the TDLS device 120 is does not store persistent information associated with TDLS sessions. Conversely, the TDLS persistent capable bit 134 could be set to 1 to signify that the TDLS device 120 stores persistent information associated with TDLS sessions. The TDLS persistent capable bit 134 could be larger than a single bit, and could be set to any value to signify that the TDLS device stores or does not store persistent information associated with TDLS sessions.

At 304, the TDLS device 120 sends out an open access TDLS discovery request 202. For example, the TDLS discovery request 202 may be transmitted on a public action frame. The TDLS discovery request 202 seeks out other TDLS devices and includes the TDLS persistent capable bit 134.

At 306, the TDLS device 120 receives a TDLS discovery response 204. The TDLS discovery response 204 comes from another TDLS device, and includes information necessary to establish a TDLS session between the TDLS device 120 and the other TDLS device. This information could include the other TDLS device's name, MAC address, BSSID, and application capabilities.

At 308, optionally, if the other TDLS device is not connected to the same access point as the TDLS device 120, the TDLS device 120 may ask the other TDLS device to connect to the same access point. TDLS sessions may require the TDLS device 120 and the other TDLS device to be connected to the same access point for TDLS setup.

At 310, the TDLS device 120 performs a TDLS setup with the other TDLS device. These operations are similar to those described above in relation to FIG. 2, specifically TDLS setup request 206, TDLS setup response 208, and TDLS setup confirmation 210.

At 312, the TDLS device 120 stores, in a location that is accessible to the TDLS device, information about the other TDLS device as persistent group information 136. This information could include the other device's name 140, MAC address 142, BSSID 144, and capabilities 146. The persistent group information 136 allows a TDLS session to be reestablished more efficiently, at a lower computational cost, and allows a TDLS session to be established when one or neither of the TDLS devices is connected to the same access point or either of the TDLS devices is connected to a different access point.

At 314, the TDLS device 120 and the other TDLS device establish a TDLS session. After the TDLS session is established, application data may be exchanged between the TDLS device 120 and the other TDLS device.

Figure 4:
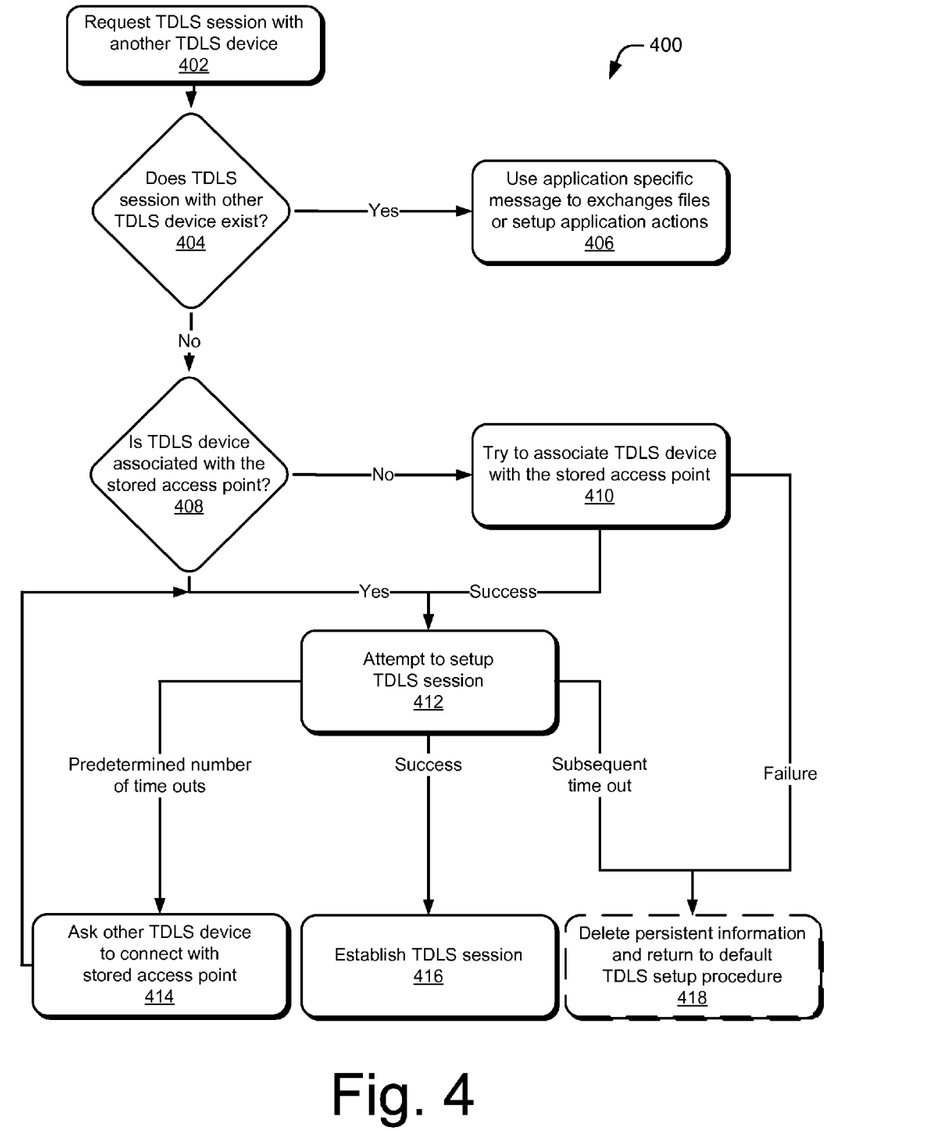
FIG. 4 illustrates a method of reestablishing a TDLS session based on persistent information.

FIG. 4 illustrates a method 400 of reestablishing or reinvoking a TDLS session based on persistent group information.

At 402, a TDLS device, such as smart phone 108 of FIG. 1, requests that a TDLS session be established with another TDLS device, such as server 114 of FIG. 1.

At 404, the TDLS device 120 determines whether a TDLS session with the other TDLS device currently exists.

At 406, if a TDLS session currently exists between the TDLS device 120 and the other TDLS device, the TDLS device 120 uses application specific messages to exchange application data between the TDLS device 120 and the other TDLS device. For example, TDLS device 120 and the other TDLS device may exchange protocol messages to setup playback of audio or video files, or may exchange audio or video files.

At 408, if a TDLS session does not currently exist between the TDLS device 120 and the other TDLS device, the TDLS device 120 determines whether the TDLS device 120 is associated with a stored access point. The stored access point was previously used to setup a TDLS session between TDLS device 120 and the other TDLS device. The stored access point may be stored in persistent group information 136, and may be identified by the BSSID.

At 410, if the TDLS device 120 is not associated with the stored access point, the TDLS device 120 attempts to associate itself with the stored access point.

At 412, if the TDLS device 120 was previously associated with the stored access point or if the TDLS device 120 successfully associates itself with the stored access point, the TDLS device 120 attempts to setup a TDLS session. The attempt is similar to the operations described above in relation to FIG. 2, specifically TDLS setup request 206, TDLS setup response 208, and TDLS setup confirmation 210.

At 414, if the attempt to setup a TDLS session times out or otherwise fails, the TDLS device 120 sends out a message, for example a public action frame message, asking the other TDLS device to connect with the stored access point. The TDLS device 120 may then wait for a pre-determined time, and then attempt to setup a TDLS session 412 again. The TDLS device 120 may send out the message asking the other TDLS device to connect a predetermined number of times, including only once or more than once.

At 416, if the attempt to setup a TDLS session between the TDLS device 120 and the other TDLS device is successful, a TDLS session is established. After the TDLS session is established, the TDLS device 120 and the other TDLS device may exchange data directly, including application data.

At 418, if the TDLS device 120 fails to associate itself with the stored access point or if the TDLS setup operation times out or otherwise fails, including after asking the other TDLS device to connect a predetermined number of times, the persistent group information associated with the other TDLS device is deleted from the TDLS device 120. Upon deletion of the persistent group information, if the TDLS device attempts to establish a TDLS session with the other TDLS device at a later time, default TDLS setup procedures are utilized. Alternatively, persistent group information may be retained despite failure or time outs.

Figure 5:
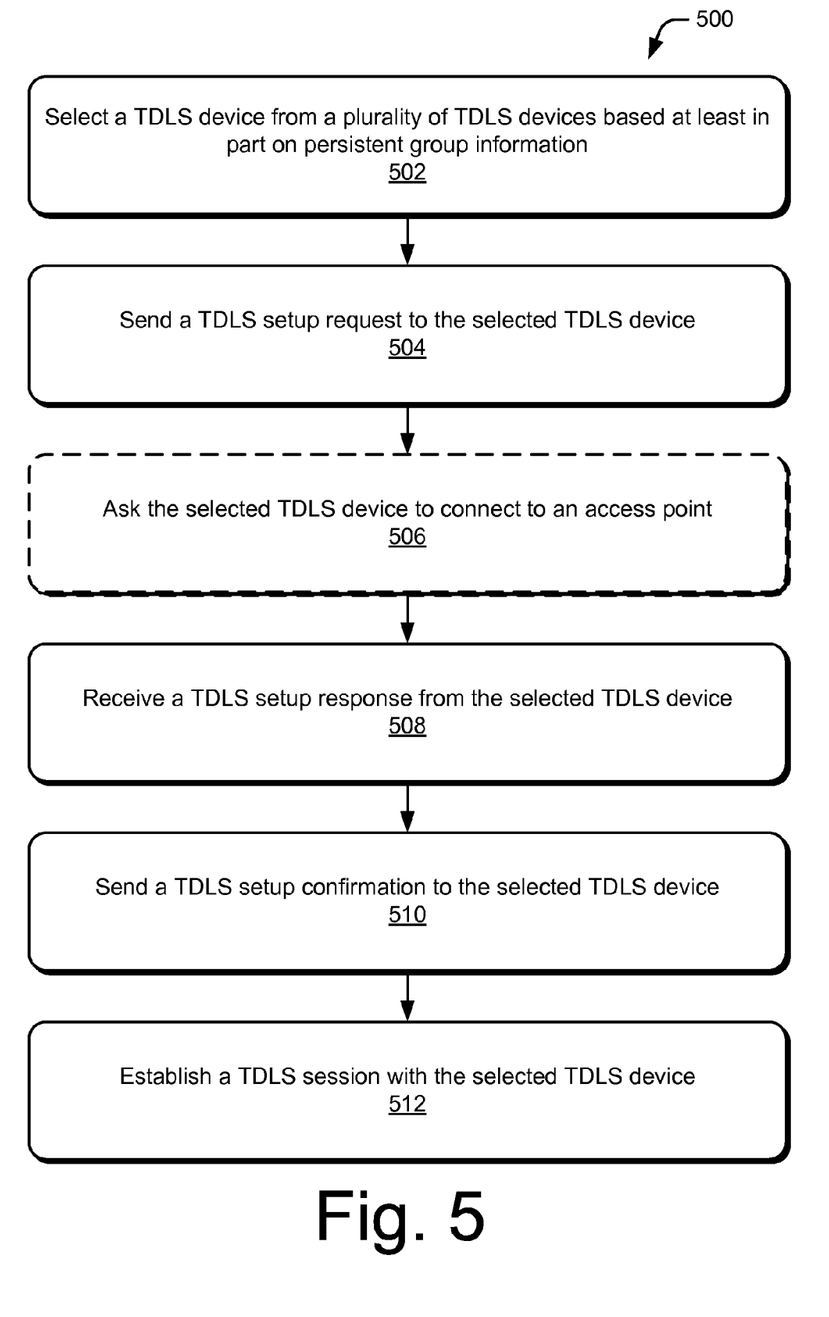
FIG. 5 illustrates a method of selecting a computing device to reestablish a TDLS session with and reestablishing the TDLS session.

FIG. 5 illustrates a method of selecting a TDLS device 120 to reestablish a TDLS session with and reestablishing the TDLS session with the selected TDLS device.

At 502, the TDLS device 120 selects another TDLS device from a plurality of TDLS devices with which to establish a TDLS session. The plurality of TDLS devices may be a list of TDLS devices with which the TDLS device 120 has previously established a TDLS session and with which the TDLS device 120 has persistent group information 136 on. The selection may be based on the capabilities of the selected TDLS device. These capabilities may be determined by searching the persistent group information 136. For example, referring to FIG. 1, TDLS device (1) may be selected from the plurality of TDLS devices TDLS device (1) through TDLS device (N) based on capabilities 146 containing a desired function, which capabilities 156 do not contain, such as capabilities 146 containing video playback when capabilities 156 only contain audio playback.

At 504, the TDLS device 120 sends a TDLS setup request 206 to the selected TDLS device. The TDLS setup request 206 utilizes the persistent group information 136 associated with the selected TDLS device. By using the persistent group information 136, the TDLS setup request 206 can be sent to the selected TDLS device without performing TDLS discovery on all the TDLS devices located within range of the TDLS device.

At 506, optionally, if the selected TDLS device is not connected to an access point stored in the persistent group information 136, the TDLS device 120 asks the selected TDLS device to connect to the stored access point. For example, the TDLS device 120 may send a public action frame to the selected TDLS device with the BSSID of the stored access point. An example indication that the selected TDLS device is not connected to an access point is a setup timeout.

At 508, the TDLS device 120 receives a TDLS setup response 208 from the selected TDLS device. Once the TDLS setup response 208 is received, a TDLS session may be established.

At 510, the TDLS device 120 sends a TDLS setup confirmation 210 to the selected TDLS device.

At 512, the TDLS device 120 establishes a TDLS session with the selected TDLS device. Once a TDLS session has been established, the TDLS device 120 and the other TDLS device may exchange data directly, without utilizing access point 106.

Networking Layers of TDLS Device

Figure 6:
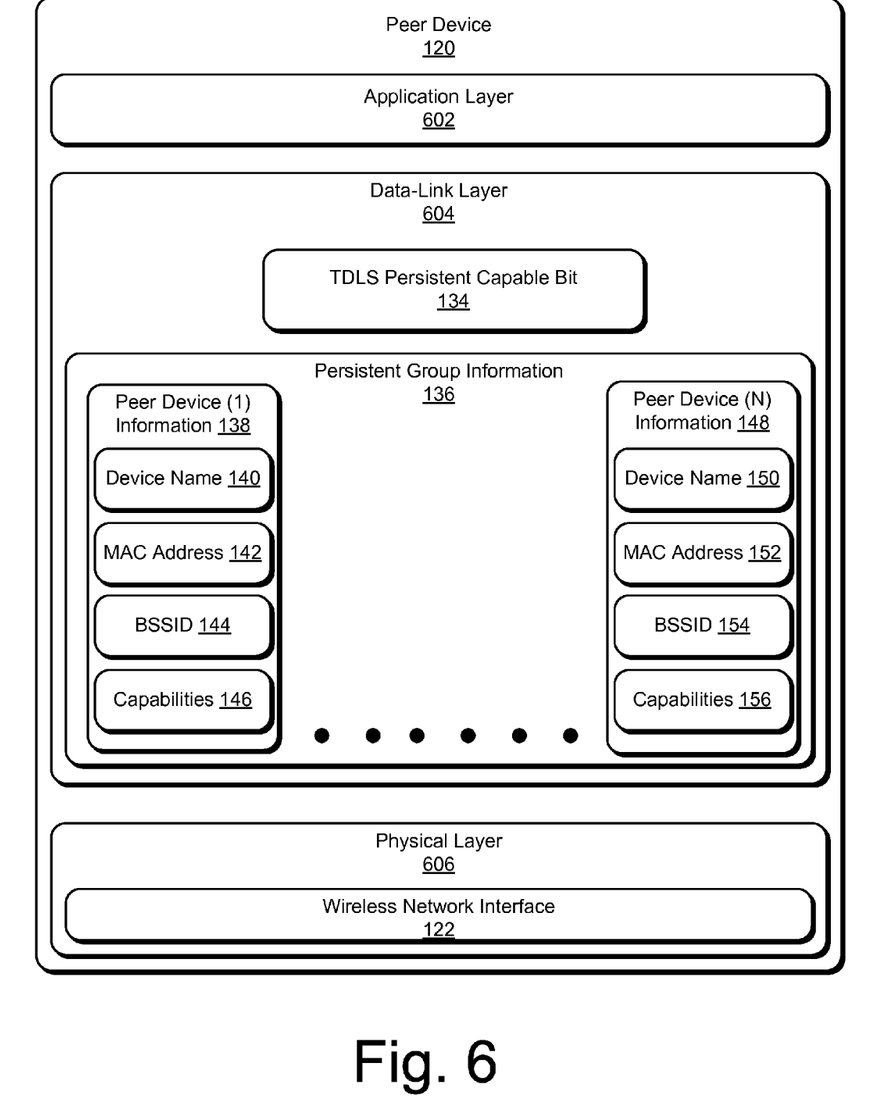
FIG. 6 illustrates a computing device with abstracted networking layers.

FIG. 6 illustrates an example of a TDLS device abstracted into networking layers including an application layer 602, data-link layer 604, and a physical layer 606.

TDLS device 120 can logically be divided into an application layer 602, data-link layer 604, and a physical layer 606. These layers generally correspond to the networking layers in the Open Systems Interconnection (OSI) model.

Application layer 602 includes application data, application instructions, and other information directly accessible to a user of the TDLS device.

Data-link layer 604 includes functional and procedural instructions on how to transfer data in a network. Data-link layer includes MAC sub-layer. TDLS persistent capable bit 134 and persistent group information 136 of TDLS device 120 may be stored in the data-link layer, specifically in the MAC sub-layer.

Physical layer 606 includes hardware networking technologies. Physical layer 606 may include wireless network interface 122 of TDLS device 120.

System-on-Chip

Figure 7:
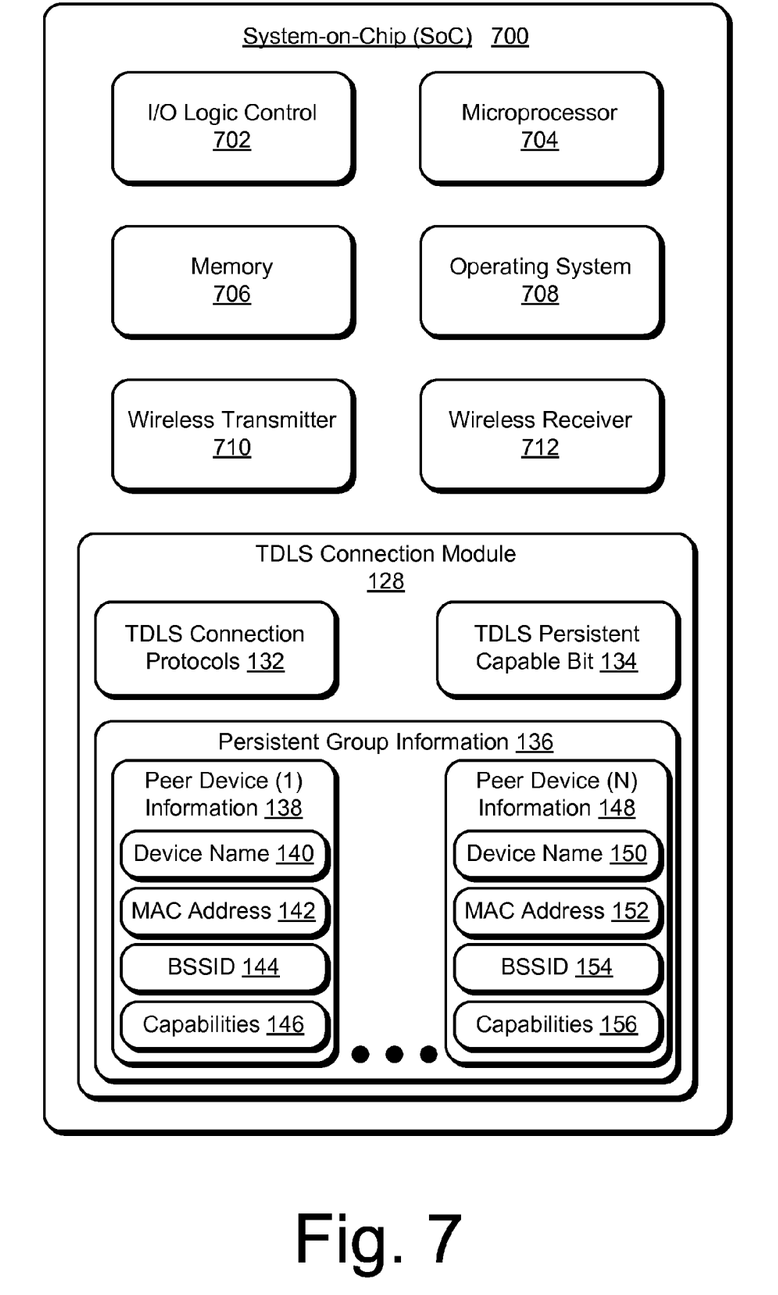
FIG. 7 illustrates a SoC environment for implementing aspects of the techniques described herein.

FIG. 7 illustrates a SoC 700, which can implement various embodiments described above. A SoC can be implemented in any suitable device, such as a video game console, IP enabled television, smart-phone, desktop computer, laptop computer, tablet computer, server, network-enabled printer, set-top box, printer, scanner, camera, picture frame, and/or any other type of device that may implement wireless connective technology.

SoC 700 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 700 can also include an integrated data bus that couples the various components of the SoC 700 for data communication between the components. A wireless communication device that includes SoC 700 can also be implemented with many combinations of differing components. In some cases, these differing components may be configured to implement concepts described herein over a wireless connection or interface.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type of RAM, low-latency nonvolatile memory (e.g., Flash memory), ROM, and/or other suitable electronic data storage. SoC 700 can also include various firmware and/or software, such as an operating system 708, which can be computer-executable instructions maintained by memory 706 and executed by microprocessor 704. SoC 700 can also include other various communication interfaces and components, communication components, other hardware, firmware, and/or software.

SoC 700 includes wireless transmitter 710, wireless receiver 712, and TDLS connection module 128 (embodied as disparate or combined components as noted above). Examples of these various components, functions, and/or entities, and their corresponding functionality, are described with reference to the respective components of the environment 100 shown in FIG. 1.

TDLS connection module 128, either independently or in combination with other entities, can be implemented as computer-executable instructions maintained by memory 606 and executed by microprocessor 604 to implement various embodiments and/or features described herein. TDLS connection module 128 may also be provided integral with other entities of the SoC 700, such as integrated with one or both of I/O logic controller 702 or any packet-based interface within SoC 700. Alternatively or additionally, TDLS connection module 128 and the other components can be implemented as hardware, firmware, fixed logic circuitry, or any combination thereof that is implemented in connection with the I/O logic control 602 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method for establishing a tunnel direct link setup (TDLS) session between a first TDLS device and a second TDLS device, the method comprising:
    sending, from the first TDLS device to the second TDLS device, a TDLS discovery request;
    in response to receiving, at the first TDLS device from the second TDLS device, a response to the TDLS discovery request, sending a TDLS setup request from the first TDLS device to the second TDLS device;
    in response to receiving, at the first TDLS device from the second TDLS device a response to the TDLS setup request:
        (i) sending a TDLS setup confirmation from the first TDLS device to the second TDLS device;
        (ii) establishing the TDLS session between the first TDLS device and the second TDLS device; and
        (iii) persistently storing, at the first TDLS device, information associated with the second TDLS device, wherein the information is persistently stored at the first TDLS subsequent to establishment of the TDLS session between the first TDLS device and the second TDLS device; and
    providing the persistently stored information to a third TDLS device sufficient to enable the third TDLS device to establish a TDLS session with the second TDLS device without performing TDLS discovery.

2. The method of claim 1, wherein the TDLS discovery request includes an indication that the first TDLS device is capable of persistently storing information associated with TDLS sessions.

3. The method of claim 2, further comprising including the indication within existing TDLS discovery request communication protocols.

4. The method of claim 1, wherein the persistently stored information comprises:

an indication whether the first TDLS device is capable of persistently storing information associated with TDLS sessions comprising a TDLS persistent capable bit; and for each additional TDLS device, including the second TDLS device, with which the TDLS device establishes a TDLS session:
- a device name of the additional TDLS device;
- a MAC address of the additional TDLS device; and
- a basic service set identifier (BSSID) associated with the additional TDLS device comprising a MAC address of an access point used to start the TDLS session between the TDLS device and the additional TDLS device.

5. The method of claim 1, further comprising discovering capabilities of applications for each additional TDLS device, including the second TDLS device, with which the first TDLS device establishes a TDLS session.

6. The method of claim 5, wherein the persistently stored information comprises the discovered capabilities of applications for each additional TDLS device with which the TDLS device establishes a TDLS session.

7. The method of claim 1, wherein the first TDLS device includes a MAC layer.

8. A method for reestablishing a tunnel direct link setup (TDLS) session between a first TDLS device and a second TDLS device, the method comprising:
- selecting, from a plurality of TDLS devices, the second TDLS device based at least in part on information persistently stored on the first TDLS device;
- sending, from the first TDLS device to the selected TDLS device, a TDLS setup request based at least in part on the persistently stored information about the selected TDLS device;
- receiving a TDLS setup response at the first TDLS device from the selected TDLS device;
- sending a TDLS setup confirmation from the first TDLS device to the selected TDLS device;
- establishing the TDLS session between the first TDLS device and the selected TDLS device; and
- providing the persistently stored information to a third TDLS device sufficient to enable the third TDLS device to establish a TDLS session with the second TDLS device without performing TDLS discovery.

9. The method of claim 8, wherein the persistently stored information comprises:
- an indication whether the first TDLS device is capable of persistently storing information associated with TDLS sessions comprising a TDLS persistent capable bit; and
- persistent group information.

10. The method of claim 9, wherein the persistent group information comprises:
- a device name for the selected TDLS device;
- a media access control (MAC) address for the selected TDLS device; and
- a basic service set identifier (BSSID).

11. The method of claim 10, wherein the BSSID comprises a MAC address for an access point that was used to connect the first TDLS device and the selected TDLS device.

12. The method of claim 10, wherein the device name is customizable.

13. The method of claim 9, further comprising:
- attempting to initiate a connection between the selected TDLS device and an access point;
- receiving an indication that the TDLS request has timed out a predetermined number of times; and
- deleting the persistent group information.

14. The method of claim 13, wherein deleting the persistent group information comprises deleting the persistent group information associated with the second TDLS device from the first TDLS device.

15. The method of claim 8, further comprising attempting to initiate a connection between the first TDLS device and an access point associated with the selected TDLS device.

16. The method of claim 15, further comprising:
- receiving an indication of failure to initiate a connection between the first TDLS device and the access point associated with the selected TDLS device; and
- deleting the persistently stored information associated with the selected TDLS device from the first TDLS device.

17. A system comprising:
- a transmitter configured to transmit, from a first tunneled direct link setup (TDLS) device, via a wireless medium a TDLS setup request based at least in part on persistently stored information about a second TDLS device of a TDLS group;
- a receiver configured to receive via the wireless medium a TDLS setup response from the second TDLS device;
- a TDLS connection module configured to establish, via the wireless medium, a TDLS session between the first TDLS device and the second TDLS device; and
- the transmitter further configured to provide the persistently stored information to a third TDLS device sufficient to enable the third TDLS device to establish a TDLS session with the second TDLS device without performing TDLS discovery.

18. The system of claim 17, wherein the persistently stored information comprises:
- an indication whether the first device is capable of persistently storing information associated with TDLS sessions; and
- information about the TDLS group comprising:
  - a device name for the second TDLS device;
  - a media access control (MAC) address for the second TDLS device;
  - a basic service set identifier (BSSID) for an access point corresponding to the second TDLS device; and
  - capabilities of applications stored on the second TDLS device.

19. The system of claim 17, wherein the TDLS connection module is further configured to:
- attempt to initiate a connection between the second TDLS device and an access point;
- receive a message comprising an indication that the TDLS request has timed out a predetermined number of times; and
- delete the persistently stored information associated with the second TDLS device from the first TDLS device.

* * * * *